Oct. 2, 1962     J. B. MURTLAND, JR., ET AL     3,056,208
DIGITAL GAGE

Filed Jan. 5, 1960                                               3 Sheets-Sheet 1

INVENTORS
James B. Murtland, Jr.
Fred J. Schoepf &
Jack W. Skinner
BY
ATTORNEY

United States Patent Office 3,056,208
Patented Oct. 2, 1962

3,056,208
DIGITAL GAGE
James B. Murtland, Jr., Tarentum, and Fred J. Schoepf and Jack W. Skinner, New Kensington, Pa., assignors to Allegheny Ludlum Steel Corporation, Brackenridge, Pa., a corporation of Pennsylvania
Filed Jan. 5, 1960, Ser. No. 544
17 Claims. (Cl. 33—147)

This invention relates to apparatus for automatically and continuously measuring the thickness or other dimension of an article as, for example, the thickness of a moving sheet or strip of material. More particularly, the invention relates to apparatus of the type described which measures the thickness or other dimension of an article by the use of digital techniques.

The present application is a continuation-in-part of our copending application Serial No. 767,478, filed October 15, 1958, and now abandoned.

Although not limited thereto, the invention described herein is particularly adapted for use in automatically measuring the thickness or gage of sheet material passing through a rolling mill. In such applications, it is sometimes necessary or desirable to control the gage of the material passing through the mill to within fine tolerances, preferably with an accuracy of one ten thousandth of an inch. Furthermore, it is desirable to continuously and automatically record or display the gage of the material from zero up to any finite thickness so that appropriate adjustments may be made in the spacing between the work rolls of the mill as the material passes therethrough. Most gages commonly used on rolling mills, instead of measuring the actual thickness of the material, indicate the deviation in thickness of the strip or sheet from a predetermined set value. A gage of this type usually consists of a pair of rollers on either side of the strip to be gaged, with one of the rollers being mechanically movable relative to the other. The movable roller is adjustably spaced from the other by means of a micrometer lead screw whereby the spacing between the rolls may be read directly from the micrometer dial. This spacing constitutes the predetermined thickness to which the gage is set. Any variation in the thickness of a sheet passing through the rollers will then cause the one roller to move relative to the other; and this movement is translated, by means of an electromechanical transducer, into an electrical signal which varies as a function of the deviation in thickness of the strip from said predetermined value. The resulting signal is then used to visually indicate the deviation in gage, or for control purposes.

Although a deviation gage of this type has found widespread use, it has certain inherent disadvantages. In addition to the fact that such gages cannot indicate the actual thickness of the strip, their accuracy is dependent upon the skill of the operator making the initial micrometer adjustment. In addition, this initial adjustment may be inaccurate due to wear of the rollers or changes in their dimensions and those of their associated parts because of temperature variations so that it is altogether desirable to provide a gage which eliminates such unfavorable conditions.

Accordingly, as an overall object, the present invention seeks to provide a new and improved dimensional gage which overcomes the disadvantages inherent in previously known gages.

More specifically, an object of the invention resides in the provision of a thickness gage which will continuously indicate the actual dimension being measured in one ten thousandths of an inch from zero up to any predetermined limit.

Another object of the invention is to provide a thickness gage which will automatically adjust itself to zero thickness whenever a measurement is not being taken to thereby compensate for any variation in parts due to wear or temperature changes.

Still another object of the invention resides in the provision of a digital thickness gage system displaying a gage read out in direct decimal numbers.

In accordance with the invention, hereinafter described, the material to be gaged is disposed between two rollers, one of which is movable relative to the other. The position of the movable roller controls a servo system which includes a two phase servomotor and two electromechanical transducers, each of which produces an alternating current output signal which varies in phase as a function of the position of a movable core. One of the transducers has its core connected to the aforesaid movable roller. The position of the movable core of the other or second transducer is controlled by a cam which is connected through a gear reducer to the servomotor. The voltage outputs of these two transducers are combined in opposing relationship; and the resulting difference signal is used to control the servomotor, the arrangement being such that the servomotor will always drive the second transducer to produce a null condition wherein the difference signal to the servomotor is zero, as is its speed. With such a system, the number of revolutions of the servomotor from a starting point will always be proportional to the spacing between the rollers and, hence, the thickness of the article being gaged. Accordingly, these revolutions in the form of analog information are converted into digital information which, in turn, is converted by means of a registering device into a visual indication of the thickness. By providing a high gear ratio gear reducer between the servomotor and the cam which controls the second transducer, a very small change in gage may be converted into a relatively large number of revolutions of the servomotor to enable the registering device to indicate a change in thickness as small as one ten thousandth of an inch. Means are also included in the system to produce an electrical signal at all times except when the registering device indicates zero thickness. If the two rollers are in contact with each other and the registering device does not indicate zero thickness as it should, the aforesaid signal will actuate means for disconnecting the servomotor from the transducers and connecting it to a separate source of driving potential which will rotate the servomotor in the proper direction until the registering means indicates zero. In this manner, a zero indication may be obtained prior to a gaging operating independently of any variation in dimensions of parts due to temperature changes or wear.

The above and other objects and features of the invention will become apparent from the following detailed description taken in connection with the accompanying drawings which form a part of this specification and in which.

Figure 1:
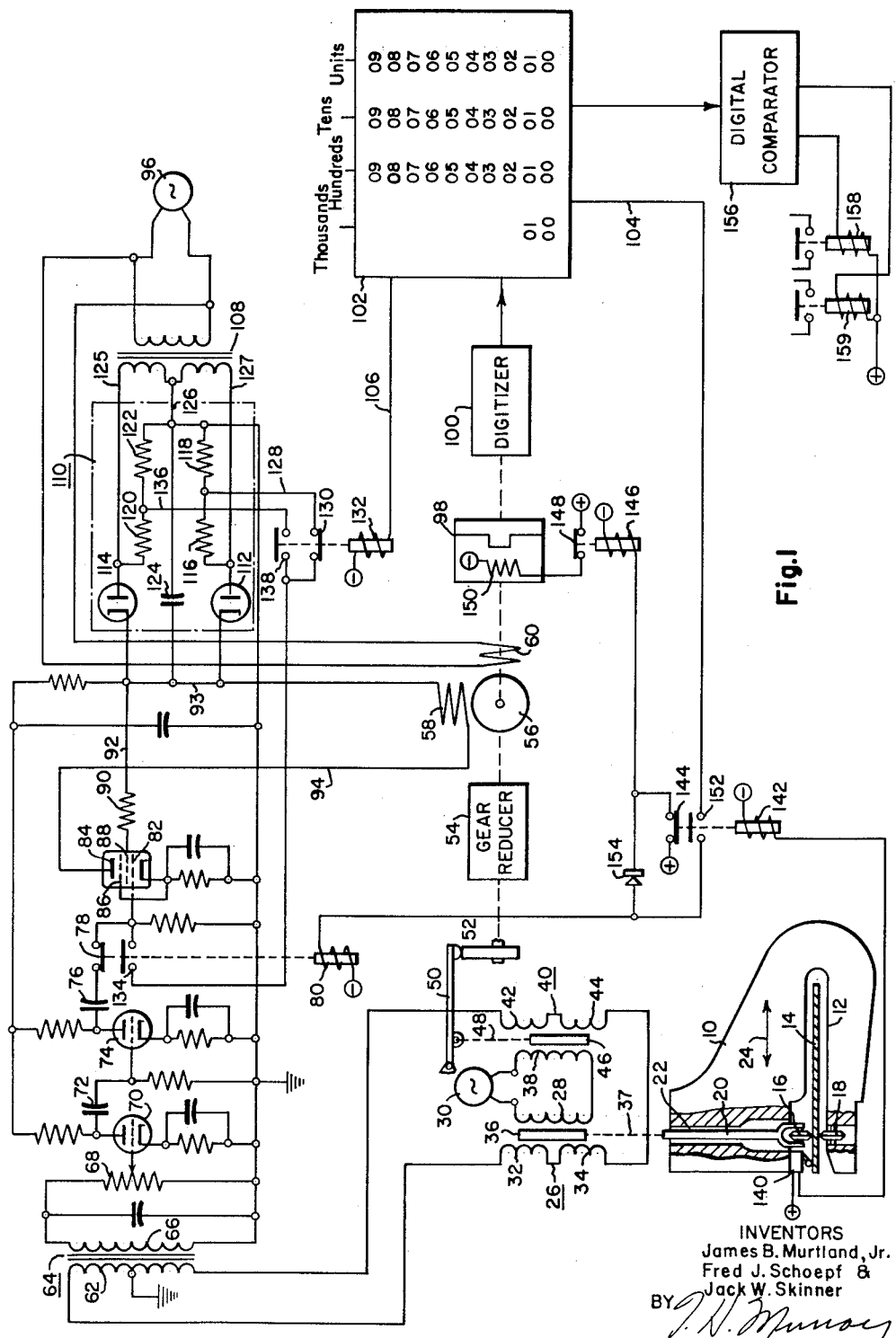
FIG. 1 is a schematic diagram of the overall system of the invention.

Referring now to FIG. 1, there is shown a generally C-shaped gage head 10 having a slot 12 extending therethrough. The slot 12 is adapted to receive a length of sheet or strip material 14 which, as will be understood, travels into or out of the plane of the drawing. As shown, the top and bottom surfaces of the strip material 14 are engaged by precision ground gaging rollers 16 and 18, with the lower roller 18 being rotatably fixed on the gage head 10. The upper gaging roller 16 is rotatably mounted on shaft 20 which is movable up and down in a vertical plane within a slot 22 provided in the gage head 10. The entire gage head, including the gaging rollers 16 and 18, is movable to the left or right as indicated by the arrow 24 in order that it may be removed from the strip 14.

As the strip 14 passes through the gage head, the gaging rollers 16 and 18 will be in rolling contact with its opposite surfaces; and as the thickness or gage of the material varies, the upper gaging roller 16 and its associated shaft 20 will move upwardly or downwardly, depending upon whether the strip 14 increases or decreases in thickness. That is, when the thickness of the strip 14 increases, the gaging roller 16 and shaft 20 will move upwardly; whereas, when the thickness of the sheet decreases, these members will move downwardly.

In order to sense the position of the gaging roller 16 and shaft 20, there is provided an electromechanical transducer, generally indicated at 26, which produces an electrical output which varies in proportion to the movement of shaft 20. The transducer includes a center or primary coil 28 which is connected to a source of alterating current 30. At either end of the primary or center coil 28 and coaxial therewith are a pair of secondary coils 32 and 34. A rod-shaped magnetically permeable core 36 is positioned axially inside the coil assembly and provides a path for the magnetic flux linking the coils. Core 36 is connected through a mechanical linkage 37 to the shaft 20 whereby the core 36 will be moved upwardly or downwardly depending upon the direction of movement of the shaft 20 and roller 16. In series with the primary winding 28 of transducer 26 is the primary winding 38 of a second electromechanical transducer 40 which is similar in construction to transducer 26 and includes a pair of secondary coils 42 and 44 as well as a movable magnetically permeable core 46. In this case, however, the core 46 is connected through mechanical linkage 48 to a lever 50 which is controlled by means of a cam 52. The cam 52, in turn, is connected through gear reducer 54 to a two phase servomotor 56 having two phases or windings 58 and 60 included therein.

With reference to transducer 26, when the primary or center coil 28 is energized with alternating current from source 30, voltages are induced in the two outer coils 32 and 34. These secondary coils are connected in series opposition, meaning that the two voltages in the secondary circuit are opposite in phase whereby the net output of the transformer is the difference of the voltages. For one central position of the core this output voltage will be zero. When the core 36 is moved from this central position, the voltage induced in the coil toward which the core is moved increases, while the voltage induced in the opposite coil decreases. This produces a differential voltage output which with proper design varies linearly with the change in core position. The motion of the core in the opposite direction beyond the central position produces a similar linear voltage characteristic, with the phase shifted 180°. Operation of transducer 40 is identical to that of transducer 26 and, thus, by proper positioning of the cores 36 and 46 in the respective transducers, the cumulative or output voltage produced across their respective secondary windings can be made equal and opposite in phase. These secondary windings are connected in series across the primary winding 62 of an input transformer 64. Thus, when the output voltages produced across the secondary windings of the respective transducers are equal and opposite in phase, the voltage appearing across the primary winding 62 will be zero. If the cores 36 and 46 are initially positioned so that zero output voltage is produced across winding 62, and if the core 36 is thereafter moved upwardly, the output voltages produced across the secondary windings of the transducers will no longer balance, and a voltage will appear across winding 62. If the core 36 moves downwardly from a balanced condition, then a voltage will again appear across winding 62, but in this case it will be shifted in phase with respect to the voltage produced when it moved upwardly from the balanced condition. The voltages appearing across the secondary winding 66 of transformer 64 are applied via variable resistor 68 to the grid of a first triode amplifier tube 70. The output of amplifier 70 is then applied in cascade relationship through capacitor 72 to the grid of a second triode amplifier tube 74 having its anode connected through capacitor 76 and the normally closed contacts 78 of a relay 80 to the control grid 82 of a pentode vacuum tube 84. As shown, the suppressor grid 86 of the pentode is connected to its cathode; whereas, its screen grid 88 is connected through resistor 90 and lead 92 to a source of plate potential on lead 93. The output of the pentode 84, which is an alternating current signal having a phase dependent upon the position of cores 36 and 46 in transducers 26 and 40, is applied through lead 94 to one terminal of winding 58 of the servomotor 56, the other terminal being connected to the plate voltage source on lead 93. The second phase or winding 60 of the servomotor 56 is connected to a source of alternating current voltage 96 which is in phase with the voltage source 30. In actual practice, the two voltage sources 96 and 30 may be the same, however they are shown separately herein for purposes of explanation. With the arrangement described, the servomotor 56 will rotate in one direction or the other, depending upon the phase of the signal applied through winding 58. This phase will, in turn, depend upon the relative positions of cores 36 and 46 in their respective transducers as was explained above.

The gear ratio of gear reducer 54 is 200 to 1, meaning that servomotor 56 will have to make 200 revolutions before the cam 52 rotates through 360°. The arrangement is such that if core 36 in transducer 26 moves upwardly, for example, motor 56 will rotate cam 52 to lower core 46 in transducer 40 until the voltages at the secondaries of the transducers balance and the servomotor stops. That is, as the core of transducer 26 is moved upwardly by the shaft 20 in response to an increase in the thickness of strip 14, the coupling is increased between its primary winding 28 and secondary winding 32, and the voltage applied to the amplifier increases. With this increase in voltage, the servomotor 56 drives the core of transducer 40 downwardly until the output voltages at the respective secondary windings are equal and the voltage appearing across winding 62 of input transformer 64 is zero. At this point the motor stops, and what has actually been done is to convert an electrical signal proportional to the change in strip thickness into a proportional rotary motion of the servomotor 56. That is, any change in thickness of the strip 14 as it passes through the gage head will induce a proportional number of revolutions in the servomotor 56 until the two transducer outputs again balance. If the thickness of the strip 14 decreases and the core 36 moves downwardly, the phase of the signal applied to servomotor 56 will be reversed, and the cam 52 will be rotated to raise the core 46 in transducer 40.

Servomotor 56 is also connected through a solenoid-operated clutch 98 to a digitizer, generally indicated at 100. The digitizer, hereinafter described in detail, is essentially a rotary switching device for energizing particular relays which represents digits in units, tens, hundreds and thousands. Each of the relays in digitizer 100 is adapted, when energized, to energize a corresponding indicating lamp in a registering device 102. In this manner, if the thickness of strip 14 is, for example, 0.0554 inch, then the relays in digitizer 100 will energize the zero lamp in the thousands group, the five lamp in the hundreds group, the five lamp in the tens group and the four lamp in the units group to indicate the correct thickness in ten thousandths of an inch. The digitizer 100 is also adapted to produce a positive voltage on lead 104 at all times except when the registering device indicates 0.0000 inch. In addition, it is provided with means for producing a positive voltage on lead 106 whenever the digitizer 100 is positioned whereby it reads less than 0.0000 inch; that is, when none of the lamps in the registering device are energized, as well as when it reads 0.0000 inch.

Alternating current source 96 is also connected through transformer 108 to a circuit 110 which has the following functions: One, it generates the direct current plate voltage on lead 93 for amplifier tubes 70, 74 and 84; and two, it produces two alternating current signals which are 180° out of phase with respect to each other. It comprises a pair of unidirectional current devices or diodes 112 and 114 having their cathodes connected to lead 93. The anode of diode 112 is connected through resistors 116 and 118 to ground; whereas, the anode of diode 114 is similarly connected through resistors 120 and 122 to ground potential. A capacitor 124 connects the cathodes of both diodes to ground, substantially as shown. The secondary winding of transformer 108 has its center point connected to ground by means of lead 126. One end of the secondary winding is connected to the anode of diode 114 via lead 125; whereas, the other end of the secondary winding is connected to the anode of diode 112 via lead 127. With this arrangement, the diodes 112 and 114 will conduct on alternate half cycles of the voltage source 96 to produce a direct current plate voltage supply on lead 93. At the same time, by virtue of the connection of the center tap of the secondary winding of transformer 108 to the junction of resistors 118 and 122, alternating current signals, 180° out of phase with respect to each other, will appear across these resistors. The alternating current signal appearing across resistor 118 may be applied via lead 128, the normally closed contacts 130 of relay 132, and the normally open contacts 134 of relay 80 to the control grid of pentode 84. Similarly, the signal appearing across resistor 122 may be applied via lead 136, the normally open contacts 138 of relay 132 and the normally open contacts 134 of relay 80 to the same grid 82 of pentode 84.

It will be apparent that when relay 80 is energized, its contacts 78 will open to disconnect transducers 26 and 40 from pentode 84. At the same time, the closure of contacts 134 will apply either one of the two alternating current signals appearing across resistors 118 and 122 to the pentode, depending upon whether contacts 130 or 138 are closed.

Reverting again to the gage head 10, it will be noted that a limit switch 140 is provided at the forward end of slot 12 and adapted to engage the strip 14 when it is inserted into the slot. With this arrangement, the limit switch 140 will open to deenergize relay 142 whenever a strip is present in the slot 12. When, however, the gage head is removed from the strip as by movement to the right in the direction of arrow 24, the limit switch will close to energize relay 142. It should be apparent that when the gage head is removed from the strip and the limit switch 140 closes, the gage rollers 16 and 18 are in contact so that the registering device 102 should indicate zero thickness. When the relay 142 is deenergized, its normally closed contacts 144 will energize relay 146 to close its contacts 148. These contacts, in turn, serve to energize the solenoid 150 of solenoid-operated clutch 98. Thus, the solenoid 150 will be energized and the clutch 98 engaged whenever the relay 142 is deenergized to close its contacts 144, that is, when the gage rollers 16 and 18 are separated. Also included in relay 142 are a pair of normally open contacts 152 which close when the relay is energized in response to closure of limit switch 140. Assuming that the gage head has been removed from the strip so that limit switch 140 closes, the relay 142 will be energized to close contacts 152 and open contacts 144. If at this time the registering device indicates 0.0000 inch, then no voltage will appear on lead 104, and relay 146 will become deenergized to deenergize the solenoid 150 and disengage clutch 98. If, however, a voltage does appear on lead 104 due to the fact that the registering device does not indicate zero thickness, then the relay 146 will still be energized through contacts 152 and diode 154 so that the clutch 98 will remain in engagement. At the same time, the relay 80 will be energized to close contacts 134 and open contacts 78. If the registering means indicates below 0.0000 inches by the fact that no indicating lamps are energized, a voltage will appear on lead 106 to energize relay 132 and close contacts 138 while opening contacts 130. This will apply an alternating current voltage of proper phase to the control grid 82 of pentode 84 to rotate servomotor 56 in one direction until the registering means indicates zero inches. At this point, the voltage on lead 104 will disappear, relays 146 and 80 will become deenergized, and the clutch 98 will become disengaged. If, on the other hand, the registering means indicates above zero thickness, no voltage will appear on lead 106 so that contacts 130 will be closed and a voltage 180° out of phase with respect to the first voltage will be applied through pentode 84 to the winding 58 of servomotor 56 to drive it in the opposite direction until 0.0000 inch is indicated, whereupon the relays 80 and 146 will again be deenergized and the clutch 98 will become disengaged. If it should happen that the two transducers 26 and 40 are not exactly balanced after the registering means indicates zero thickness and relay 80 becomes deenergized to close contacts 78, a voltage will be applied to winding 58 to rotate the servomotor 56. This rotation will continue, of course, until the outputs of the two transducers are again balanced. Since, however, the clutch 98 is disengaged during this time, the rotation of the servomotor 56 does not alter the zero indication of the registering device 102.

The system may also include a digital comparator 156 which is essentially a device for determining where a particular number registered lies with respect to selected numbers in the whole sequence of numbers registerable by the device 102. Thus, the digital comparator may energize a first output relay 158 if the measured thickness is, for example, above 0.0257 inch and a second output relay 159 if the thickness is below 0.0262 inch. If both of these relays are energized, the thickness of the strip will obviously lie between these limits. Any number of limits may be used in the comparator, and the various output relays may be used to control the spacing between mill rolls, or for other purposes. One type of comparator which may be used for this purpose is shown and described, for example, in U.S. Patent No. 2,501,821, dated March 28, 1950.

Figure 2:
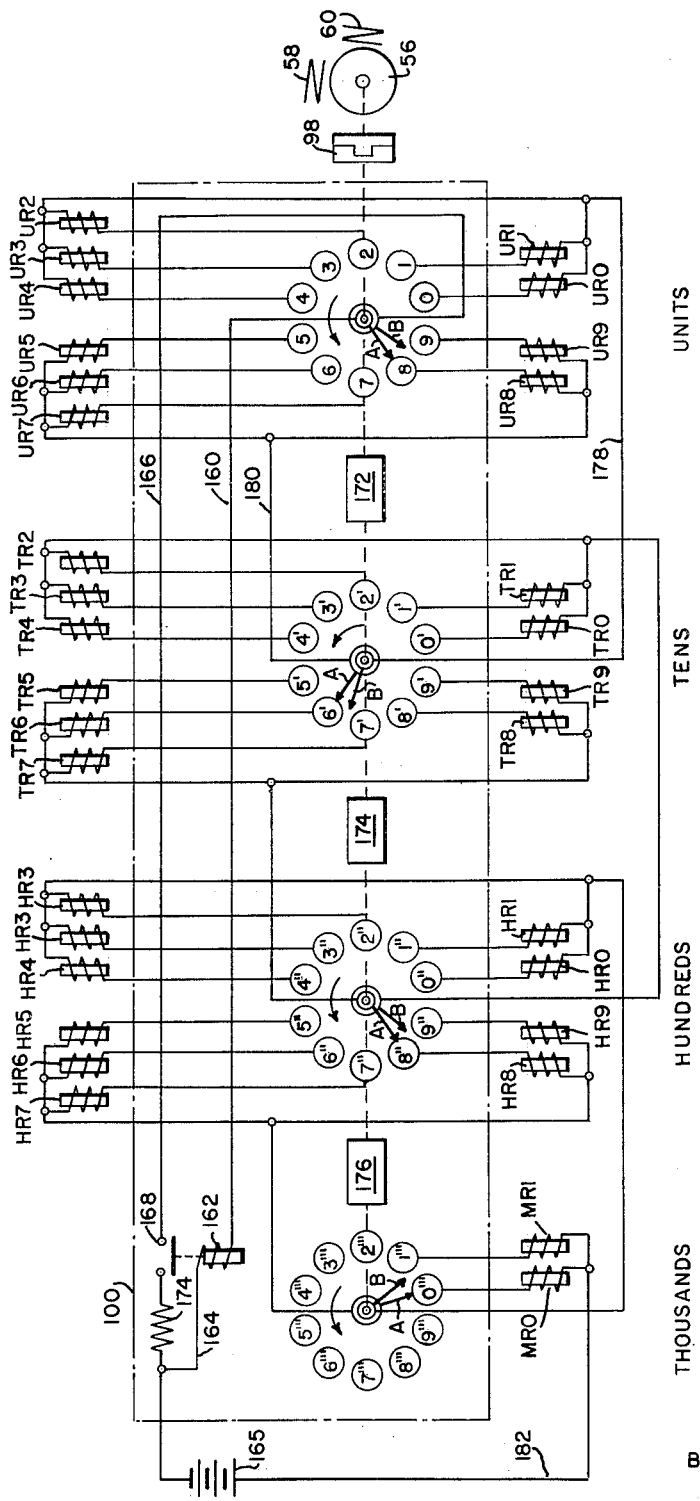
FIG. 2 is a schematic illustration of the digitizer shown in block form in FIG. 1.

Referring to FIG. 2, the digitizer 100 itself is enclosed in broken lines. The various relay energizing coils shown are actually part of the registering device 102 and are shown in FIG. 2 for purposes of explanation only. As shown, the clutch 98 is mechanically coupled through gearing to four pairs of brushes each of which is in sliding electrical contact with a group of contacts representing one digit of a digital number. As shown in the illustration, contacts 0–9 represent the numbers one to nine in the units decade, contacts 0'–9' represent the numbers one to nine in the tends decade, contacts 0"–9" represent the numbers one to nine in the hundreds decade, and contacts 0'''–9''' represent the numbers one to nine in the thousands decade. Each pair of brushes comprises a master brush A and a slave brush B with the slave brush B leading the master brush A by about one-half of the distance between successive contacts in each group of contacts. The master brush A in the units decade is connected through lead 160 to one side of the energizing coil of a relay 162. The other side of the coil of relay 162 is connected through lead 164 to a source of negative voltage at 165. The slave brush B is connected through lead 166 and the normally closed contacts 168 of relay 162 to a source of negative voltage via resistor 170. With this arrangement, the master brush A in the units decade is always in command if it is touching any of the ten digit contacts 0–9. Any such contact of the master brush A energizes the relay 162 and opens contacts 168 to the slave brush B. Thus, the slave brush will read only during a transfer of the master brush from one contact to the next when relay 162 is deenergized and its movable contact 168 is in the normally closed position. Each of the brushes A and B in the respective decades is connected to the succeeding decade through a gear reducer 172, 174 or 176. With this arrangement, the brushes A and B in the units decade will have to make one complete revolution before the brushes in the tens decade move from one digit to the next. Similarly, the brushes in the tens decade will have to make one complete revolution before the brushes in the hundreds decade move from one digit to the next, and so on.

It will be noted that the contacts 0–4 in the units decade are all connected through their corresponding relays UR0–UR4 and lead 178 to the slave brush B in the tens decade. Similarly, the contacts 5–9 in the units decade are each connected through their associated relays UR5–UR9 and lead 180 to the master brush A in the tens decade. The two decades are geared together whereby the slave brush B in the tens decade will make contact with a particular digit during the time that the brushes A and B of the units decade make with contacts 0–4. During the second half of the revolution when the contacts A and B of the units decade make with contacts 5–9, the master brush A in the tens decade will be in contact with that particular digit or contact. Thus, the first five contact points in each decade are connected to the slave brush B in the next successive decade which makes contact with a particular contact first, and the last five contacts are connected to the master brush A which makes contact with that particular contact last during the last half revolution of the preceding decade. As shown, each of the relays associated with a particular contact point is indicated by an MR, HR, TR or UR number, depending upon which decade it is associated with.

In order to simplify the explanation of the digitizer, a certain number of assumptions will have to be made. First, it will be assumed that the servomotor has rotated so that the master brush A of the units decade is on contact 8, the master brush A in the tens decade is on contact 6', the master brush A in the hundreds decade is on contact 8", and the master brush A in the thousands decade is on the 0''' contact. Under these circumstances, a series circuit will be established between lead 164 and lead 182 which is connected to a negative source of potential at 165 through relay 162, lead 160, master brush A in the units decade, contact point 8, relay UR8, lead 180, master brush A in the tens decade, contact point 6', relay TR6, master brush A in the hundreds decade, relay HR8, master brush A in the thousands decade, contact point 0''' and relay MR0. Thus, the relays MR0, HR8, TR6 and UR8 will be energized. The system is designed whereby the number of revolutions of the servomotor made for this condition corresponds to the thickness of the strip 14 of 0.0868 inch. If, for example, the thickness of the strip should change to 0.0521 inch, then the following relays would be energized: MR0, HR5, TR2, and UR1. As will be understood, the various combinations of energized relays in the thousands, hundreds, tens and units decades will in this manner indicate any thickness of the strip in inches with an accuracy of one ten thousandth of an inch.

Figure 3:
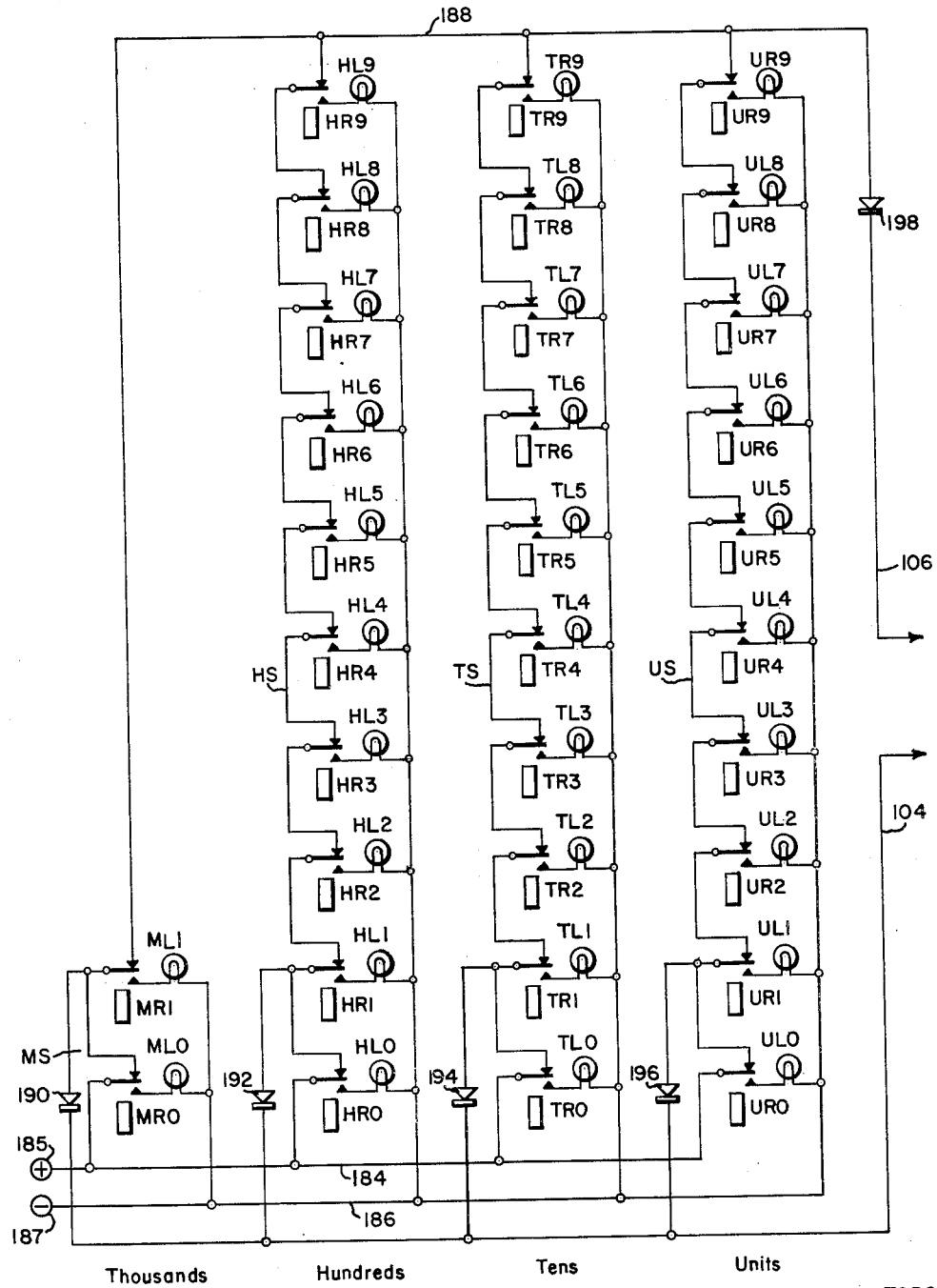
FIG. 3 is a circuit diagram of the thickness registering means of the invention together with the means for producing a voltage at all times except when the registering means indicates zero thickness, as well as the means for producing a voltage when the registering means indicates below zero thickness.

Referring to FIG. 3, the registering device 102 includes the various relays shown in FIG. 2. Each of these relays is normally deenergized and has a pair of normally closed contacts which are connected in series with the normally closed contacts of the other relays for that particular decade. Thus, the normally closed contacts of the thousands decade provide a connection between lead 184 and lead 188 through series path MS, the normally closed contacts of the hundreds decade provide a series path HS, the normally closed contacts of the tens decade provide a series path TS, and the normally closed contacts of the units decade provide a series path US. Furthermore, the series-connected normally closed contacts for each decade are connected via lead 184 to a source of positive voltage at 185. Whenever one of the relays in the thousands, hundreds, tens or units decade is energized, its contacts will be reversed to connect the lead 184 to an associated indicating lamp which has its other side connected through lead 186 to a source of negative voltage at 187. Thus, if relays MR0, HR8, TR6 and UR8 are energized, then lamps ML0, HL8, TL6 and UL8 will also be energized to indicate that the thickness of the strip is 0.0868 inch. In this manner, it will be seen that as the servomotor 56 rotates in one direction or the other to compensate for variations in strip thickness, various combinations of relays will be energized in the thousands, hundreds, tens and units decades; and these relays will, in turn, energize their associated indicating lamps to visually indicate the gage of the strip at any instant.

The movable contact members of relays MR1, HR1, TR1 and UR1 are connected as shown through rectifiers 190, 192, 194 and 196 to lead 104. It will be remembered that lead 104 is shown in FIG. 1 and is used to energize relay 80 when contacts 152 of relay 142 are closed. The lead 104 will always be connected to a source of positive voltage via lead 184 through the normally closed contacts of either MR0, HR0, TR0 or UR0, except when the registering device indicates zero thickness. That is, unless the indicating device registers zero thickness, at least one of the relays MR0, HR0, TR0 and UR0 will be deenergized so that a connection will be provided between leads 184 and 104. When, however, a zero indication is achieved so that relays MR0, HR0, TR0 and UR0 are all energized, the lead 104 will be disconnected from lead 184 so that the voltage thereon will disappear and the relays 80 and 146 of FIG. 1 will be deenergized, assuming that contacts 152 are closed.

As was explained above, each group of serially-connected normally closed contacts in each group of relays in the thousands, hundreds, tens and units decades is connected to the lead 188 which, in turn, is connected through rectifier 198 to the lead 106, also shown in FIG. 1. Whenever the positions of the brushes of digitizer 100 are such that none of the lamps in the registering device are energized, meaning that a thickness below zero is indicated, each of the series paths MS, HS, TS and US connect lead 184 to lead 188 so that a positive voltage will appear on lead 106 to energize the relay 132 shown in FIG. 1. When, however, the registering device indicates zero thickness or above zero thickness, one of the relays in each of the decades will be energized to break the connection between leads 184 and 188, and the relay 132 will become deenergized to reverse the phase of the output signal applied to servomotor 56 when contacts 134 are closed.

In the operation of the device, the system will be initially calibrated by removing the gage head 10 from strip 14 whereby rollers 16 and 18 will be in contact with each other and limit switch 140 will be closed to energize relay 142. If the registering device 102 does not indicate zero thickness at this time, relay 80 will be energized to disconnect the servomotor 56 from the transducers 26 and 40 and connect it to circuit 110 for producing two alternating current signals which are 180° out of phase with respect to each other. If none of the lamps in the registering device are energized, thereby indicating below zero thickness, the relay 132 will be energized to apply one of the two alternating curent signals from circuit 110 to the servomotor, thereby rotating the servomotor in one direction. If, on the other hand, the registering means indicates above zero thickness, the relay 132 will remain deenergized so that the servomotor will be rotated in the opposite direction. In either case, the servomotor will be rotated until the registering means indicates zero thickness, at which point the relays 80 and 146 will become deenergized to disengage clutch 98 and connect the servomotor to the transducers. If the outputs of the transducers are not exactly balanced at this time, the servomotor will rotate in one direction or the other to bring them back into balance, but since the clutch 98 is now disengaged, the zero indication of the registering device 102 is not altered. The system is now ready to take thickness measurements; and when the gage head is passed over strip 14, relay 142 will become deenergized to engage clutch 98 whereby the registering device 102 will indicate the actual thickness of the strip from zero up to a maximum limit determined by the parameters of the system.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A thickness gage comprising first and second members between which an article to be gaged is disposed, at least one of said members being movable relative to the other to accommodate articles of different thicknesses, first transducer means operatively connected to said movable member and adapted to produce a first electrical signal which varies as a function of the thickness of the article being gaged, apparatus for producing a mechanical movement, second transducer means responsive to said mechanical movement for producing a second electrical signal which varies as a function of said mechanical movement, circuit means for combining said first and second signals in opposing relationship to produce a difference signal, means responsive to said difference signal for controlling said apparatus whereby the mechanical movement will be produced until the first and second signals are equal and opposite and the difference signal is zero, registering means controlled by said apparatus for indicating the thickness of said article, means for producing an electrical current at all times except when the registering means indicates zero thickness, and means operative when said first and second members are in contact with each other for actuating said apparatus for producing movement until said current ceases and the registering means indicates zero thickness.

2. A thickness gage comprising first and second members between which an article to be gaged is disposed with at least one of the members being movable relative to the other to accommodate articles of different thicknesses, a servo system operatively connected to said one member for converting the distance between said members into a proportional number of revolutions of a servomotor, registering means controlled by said servomotor for indicating the thickness of said article, a clutch interconnecting said servomotor with the registering means, apparatus adapted when said members are in contact with each other to disconnect the servomotor from the remainder of the servo system and to rotate said servomotor with the clutch engaged until said registering means indicates zero thickness, and apparatus adapted to disengage said clutch and connect the servomotor to the remainder of the servo system when the members are in contact with each other and the registering means indicates zero thickness whereby the servomotor may be rotated to produce a null condition in the servo system without disturbing the zero indication of the registering means.

3. A gage comprising a pair of separable members between which an article to be gaged is disposed, a servo system operatively connected to at least one of said members for converting the distance between said members into a proportional number of revolutions of a servomotor, registering means controlled by said servomotor for indicating the thickness of said article, a clutch interconnecting said servomotor with the registering means, and means for disengaging said clutch when the members are in contact with each other and the registering means indicates zero thickness.

4. A gage including a pair of separable members between which an article to be gaged is disposed, a servo system operatively connected to at least one of said members for converting the distance between said members into a proportional number of revolutions of a servomotor, registering means controlled by said servomotor for indicating the thickness of said article, a clutch device operatively connecting the servomotor to the registering means at all times except when said members are in contact with each other and the registering means indicates zero thickness, means for rotating said servomotor in one direction when said members are in contact with each other and the registering means indicates above zero thickness, and means for rotating the servomotor in the opposite direction when said members are in contact with each other and the registering means indicates below zero thickness.

5. In a gage including a pair of separable members between which an article to be gaged is disposed, a servo system operatively connected to at least one of said members for converting the distance between said members into a proportional number of revolutions of a servomotor, and registering means controlled by said servomotor for indicating the thickness of said article; the improvement of means for adjusting said registering means to indicate zero thickness when the members are in contact with each other comprising, in combination, a first source of driving potential adapted to rotate the servomotor in one direction, a second source of driving potential adapted to rotate the servomotor in the opposite direction, first switch means actuable when said members are in contact with each other, second switch means controlled by the first switch means and adapted when the registering means indicates other than zero thickness to disconnect the servomotor from the remainder of the servo system, and third switch means operable when said second switch means is actuated to apply one of said sources of driving potential to said servomotor when the registering means indicates above zero thickness and the other source of driving potential to said servomotor when the registering means indicates below zero thickness.

6. In a gage including a pair of separable members between which an article to be gaged is disposed, a servo system operatively connected to at least one of said members for converting the distance between said members into a proportional number of revolutions of a servomotor, and registering means controlled by said servomotor for indicating the thickness of said article; the improvement of means for adjusting said registering means to indicate zero thickness when the members are in contact with each other comprising, in combination, first switch means actuable when said members are in contact with each other, second switch means controlled by the first switch means and adapted when the registering means indicates other than zero thickness to disconnect the servomotor from the remainder of the servo system, and apparatus including third switch means operable when said second switch means is actuated to rotate said servomotor in one direction when the registering means indicates above zero thickness and in the other direction when the registering means indicates below zero thickness.

7. In a gage including a pair of separable members between which an article to be gaged is disposed, a servo system operatively connected to at least one of said members for converting the distance between said members into a proportional number of revolutions of a servomotor, and registering means controlled by said servomotor for indicating the thickness of said article; the improvement of means for adjusting said registering means to indicate zero thickness when the members are in contact with each other comprising, in combination, a clutch interconnecting said servomotor with the registering means, first switch means actuable when said members are in contact with each other, second switch means controlled by the first switch means and operable when the registering means indicates other than zero thickness for disconnecting the servomotor from the remainder of the servo system, third switch means adapted to disengage said clutch when the first switch means is actuated and the registering means indicates zero thickness, and apparatus including fourth switch means operable when said second switch means is actuated to rotate the servomotor in one direction when the registering means indicates above zero thickness and in the opposite direction when the registering means indicates below zero thickness.

8. A thickness gage comprising first and second members between which an article to be gaged is disposed, at least one of said members being movable relative to the other to accommodate articles of different thicknesses, means controlled by said movable member for producing a current variation, separate means for producing a current variation, a combining circuit for comparing the respective current variations in opposing relationship to produce a difference signal, a servomotor operable under the control of said difference signal, means controlled by said servomotor for controlling the operation of said separate means for producing a current variation, registering means controlled by said servomotor for indicating the thickness of said article, first relay means actuable only when the registering means indicates zero thickness or below zero thickness, second relay means actuable when said first and second members are in contact with each other, and apparatus responsive when below zero thickness is indicated to actuation of said first and second relay means for driving said servomotor until the registering means indicates zero thickness.

9. In a thickness gage having first and second members between which an article to be gaged is disposed with at least one of the members being movable relative to the other to accommodate articles of different thicknesses, a servo system including a rotatable servomotor, a first transducer operatively connected to said movable member for producing a current which varies as a function of the position of the movable member, a second transducer for producing a current which varies as a function of the number of revolutions of said servomotor in either direction from a starting point, circuit means for comparing the currents produced by said transducers in opposition to produce a difference signal, means responsive to said difference signal for controlling operation of the servomotor, registering means controlled by said servomotor for indicating the thickness of said article, first switch means actuable when the registering means indicates zero thickness or below zero thickness, second switch means actuable when said members are in contact with each other, and apparatus operable by said first and second switch means when the members are in contact and the registering means indicates below zero thickness for rotating the servomotor until the registering means indicates zero thickness.

10. In a thickness gage having first and second members between which an article to be gaged is disposed with at least one of the members being movable relative to the other to accommodate articles of different thicknesses, a servo system including a rotatable servomotor, a first electromechanical transducer having a movable core therein, means connecting said movable member to the core of said first transducer whereby the transducer will produce a current variation which varies as a function of the position of the movable member, a second electromechanical transducer having a movable core therein, rotary cam means for moving the core in said second transducer whereby the second transducer will produce a current which varies as a function of the position of said cam means, gear reducer means connecting said servomotor to said cam means whereby the servomotor will turn through a large number of revolutions before the cam means rotates once, circuit means for comparing the currents produced by said first and second transducers in opposing relationship to produce a difference signal, means responsive to said difference signal for controlling operation of the servomotor, registering means controlled by said servomotor for indicating the thickness of said article, and a clutch device operatively connecting the servomotor to the registering means at all times except when said members are in contact with each other and the registering means indicates zero thickness.

11. In a thickness gage having first and second members between which an article to be gaged is disposed with at least one of the members being movable relative to the other to accommodate articles of different thicknesses, a servo system including a two phase servomotor, a first electromechanical transducer having a movable core therein and adapted to produce an alternating current output signal having a phase dependent upon the position of said movable core, means connecting said movable member to the core of said first transducer, a second electromechanical transducer having a movable core therein and adapted to produce an alternating current output signal having a phase dependent upon the position of its movable core, rotary cam means for moving the core in said second transducer whereby the phase of the output signal of said second transducer will be a function of the position of the cam means, gear reducer means connecting said servomotor to said cam means, circuit means for combining the output signals of said first and second transducers in phase opposition to produce a difference signal having a phase dependent upon the phases of said output signals, amplifier means for applying said difference signal to one phase of said two phase servomotor whereby the motor will rotate in one direction or the other depending upon the phase of the difference signal, registering means controlled by said servomotor for indicating the thickness of said article, first switch means actuable when the registering means indicates zero thickness or below zero thickness, second switch means actuable when said members are in contact with each other, and apparatus operable by said first and second switch means when the members are in contact and the registering means indicates below zero thickness for rotating the servomotor until the registering means indicates zero thickness.

12. In a thickness gage having first and second members between which an article to be gaged is disposed with at least one of the members being movable relative to the other to accommodate articles of different thicknesses, a servo system including a two phase servomotor, a first electromechanical transducer having a movable core therein and adapted to produce an alternating current output signal having a phase dependent upon the position of said movable core, means connecting said movable member to the core of the said first transducer, a second electromechanical transducer having a movable core therein and adapted to produce an alternating current output signal having a phase dependent upon the position of its movable core, rotary cam means for moving the core in said second transducer whereby the phase of the output signal of said second transducer will be a function of the position of the cam means, means connecting said servomotor to said cam means, circuit means for combining the output signals of said first and second transducers in phase opposition to produce a difference signal having a phase dependent upon the phases of said output signals, amplifier means for applying said difference signal to one phase of said two phase servomotor whereby the motor will rotate in one direction or the other depending upon the phase of the difference signal, means for producing two alternating current control signals which are 180° out of phase with respect to each other, registering means controlled by said servomotor for indicating the thickness of said article, first switch means actuable when said members are in contact with each other, second switch means controlled by the first switch means and adapted when the registering means indicates other than zero thickness to disconnect the amplifier from said one phase of the servomotor while connecting said means for producing two alternating current signals to said one phase, and third switch means operable when said second switch means is actuated to apply one of said alternating current control signals to said one phase of the servomotor when the registering means indicates above zero thickness and the other alternating current control signal to said one phase when the registering means indicates below zero thickness.

13. In a thickness gage having first and second members between which an article to be gaged is disposed with at least one of the members being movable relative to the other to accommodate articles of different thicknesses, a servo system including a two phase servomotor, a first electromechanical transducer having a movable core therein and adapted to produce an alternating current output signal having a phase dependent upon the position of said movable core, means connecting said movable member to the core of said first transducer, a second electromechanical transducer having a movable core therein and adapted to produce an alternating current output signal having a phase dependent upon the position of its movable core, rotary cam means for moving the core in said second transducer whereby the phase of the output signal of said second transducer will be a function of the position of the cam means, means connecting said servomotor to said cam means, circuit means for combining the output signals of said first and second transducers in phase opposition to produce a difference signal having a phase dependent upon the phases of said output signals, amplifier means for applying said difference signal to one phase of said two phase servomotor whereby the motor will rotate in one direction or the other depending upon the phase of the difference signal, means for producing two alternating current control signals which are 180° out of phase with respect to each other, registering means controlled by said servomotor for indicating the thickness of said article, a clutch interconnecting the servomotor with the registering means, first switch means actuable when said members are in contact with each other, second switch means controlled by the first switch means and adapted when the registering means indicates other than zero thickness to disconnect the amplifier from said one phase of the servomotor while connecting said means for producing two alternating current control signals to said one phase, third switch means adapted to disengage said clutch when the first switch means is actuated and the registering means indicates zero thickness, and fourth switch means operable when said second switch means is actuated to apply one of said alternating current control signals to said one phase of the servomotor when the registering means indicates above zero thickness and the other alternating current control signal to said one phase when the registering means indicates below zero thickness.

14. In a thickness gage having first and second members between which an article to be gaged is disposed with at least one of the members being movable relative to the other to accommodate articles of different thicknesses, a servomotor system including a rotatable servomotor, a first electromechanical transducer operatively connected to said movable member for producing an output signal which varies as a function of the position of the movable member, a second electromechanical transducer for producing a signal which varies as a function of the number of revolutions of said servomotor in either direction from a starting point, circuit means for comparing the signals produced by said transducers in opposing relationship to produce a difference signal, amplifier means for applying said difference signal to said servomotor to rotate the servomotor in one direction or the other depending upon the characteristics of said difference signal, registering means controlled by said said servomotor for indicating the thickness of said article, a first source of driving potential adapted to rotate said servomotor in one direction, a second source of driving potential adapted to rotate the servomotor in the opposite direction, first switch means actuable when said members are in contact with each other, second switch means controlled by the first switch means and adapted when the registering means indicates other than zero thickness to disconnect the amplifier means from said servomotor, and third switch means operable when said second switch means is actuated to apply one of said sources of driving potential to said servomotor when the registering means indicates above zero thickness and the other source of driving potential to said servomotor when the registering means indicates below zero thickness.

15. In a thickness gage having first and second members between which an article to be gaged is disposed with at least one of the members being movable relative to the other to accommodate articles of different thicknesses, a servomotor system including a rotatable servomotor, a first electromechanical transducer operatively connected to said movable member for producing an output signal which varies as a function of the position of the movable member, a second electromechanical transducer for producing a signal which varies as a function of the number of revolutions of said servomotor in either direction from a starting point, circuit means for comparing the signals produced by said transducers in opposing relationship to produce a difference signal, amplifier means for applying said difference signal to said servomotor whereby the servomotor will be rotated in one direction or the other depending upon the characteristics of said difference signal, registering means controlled by said servomotor for indicating the thickness of said article, a first source of driving potential adapted to rotate said servomotor in one direction, a second source of driving potential adapted to rotate the servomotor in the opposite direction, a clutch interconnecting the servomotor with the registering means, first switch means actuable when said members are in contact with each other, second switch means controlled by said first switch means and adapted when the registering means indicates other than zero thickness to disconnect the amplifier means from the servomotor, third switch means adapted to disengage said clutch when the first switch means is actuated and the registering means indicates zero thickness, a fourth switch means operable when said second switch means is actuated to apply one of said sources of driving potential to said servomotor when the registering means indicates above zero thickness and the other source of driving potential to said servomotor when the registering means indicates below zero thickness.

16. A gage including a pair of separable members between which an article to be gaged is disposed, a servo system operatively connected to at least one of said members for converting the distance between the members into a proportional number of revolutions of a servomotor, registering means controlled by said servomotor for indicating the thickness of said article, a first source of voltage for rotating the servomotor in one direction, a second source of voltage for rotating the servomotor in the other direction, first switch means actuated when said members are in contact with each other, second switch means controlled by the registering means and operative when said first switch means is actuated for applying said first source of voltage to the servomotor to rotate it in said one direction when the registering means indicates above zero thickness, and third switch means controlled by the registering means and operative when said first switch means is actuated for applying said second source of voltage to the servomotor to rotate it in said other direction when the registering means indicates below zero thickness.

17. A gage including a pair of separable members between which an article to be gaged is disposed, a servo system operatively connected to at least one of said members for converting the distance between the members into a proportional number of revolutions of a servomotor, registering means controlled by said servomotor for indicating the thickness of said article, a source of voltage, and circuit means including first switch means actuated when said members are in contact with each other and second switch means actuated when the registering means indicates zero thickness or below zero thickness and effective when the first switch means is actuated for connecting the voltage source to the servomotor to rotate the same until said registering means indicates zero thickness, the servomotor serving to actuate the registering means in a subtractive sense when the indication is above zero thickness and in an additive sense when the indication is below zero thickness.

References Cited in the file of this patent

UNITED STATES PATENTS

| | | |
|---|---|---|
| 2,180,175 | Sivertsen | Nov. 14, 1939 |
| 2,299,997 | Ladrach | Oct. 27, 1942 |
| 2,420,539 | Hornfeck | May 13, 1947 |
| 2,666,912 | Gow et al. | Jan. 19, 1954 |
| 2,874,900 | Linderman | Feb. 24, 1959 |
| 2,932,089 | Dexter et al. | Apr. 12, 1960 |

OTHER REFERENCES

Macgeorfe: "The Differential Transformer for Control Indication," Product Engineering, 1953 Annual Digest, pp. 116–121; published by McGraw-Hill Publishing Co., New York, N.Y. (Copy in Div. 66.)